Figure 1:
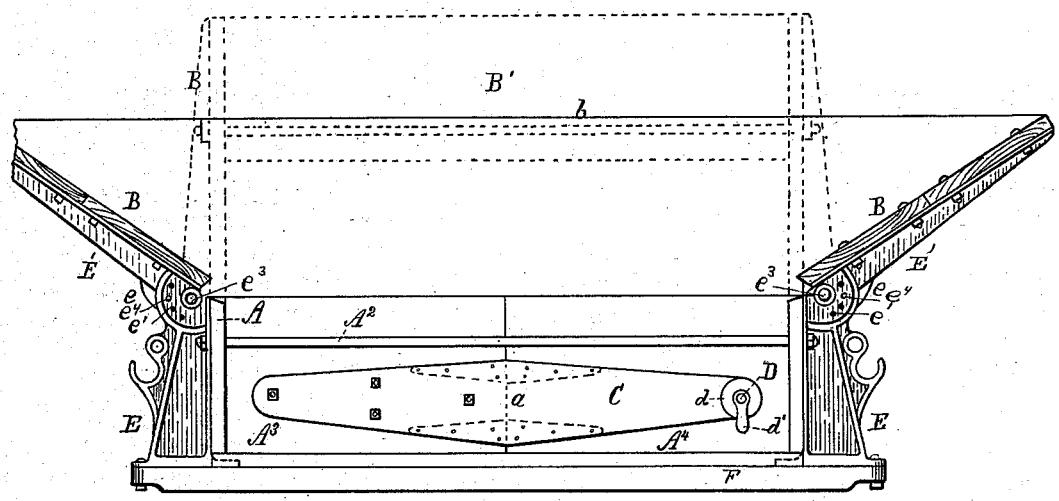

(No Model.)

S. E. OVIATT.
WAGON BOX.

No. 402,183. Patented Apr. 30, 1889.

Witnesses:
John Schuman
Charles Salow

Inventor:
Solomon E. Oviatt
By Newell S. Wright
Att'y

UNITED STATES PATENT OFFICE.

SOLOMON E. OVIATT, OF LANSING, MICHIGAN, ASSIGNOR OF ONE-HALF TO REUBEN ANDRÉ, OF AKRON, OHIO.

WAGON-BOX.

SPECIFICATION forming part of Letters Patent No. 402,183, dated April 30, 1889.

Application filed June 16, 1888. Serial No. 277,291. (No model.)

*To all whom it may concern:*

Be it known that I, SOLOMON E. OVIATT, a citizen of the United States, residing at Lansing, county of Ingham, State of Michigan, have invented a certain new and useful Improvement in Wagon-Boxes and Wagon-Stakes; and I declare the following to be a full, clear, and exact description of the invention, such as will enable others skilled in the art to which it appertains to make and use the same, reference being had to the accompanying drawings, which form a part of this specification.

My invention relates to an improvement in wagon-boxes and wagon-stakes; and it consists of the devices and appliances, with their combinations and arrangements, as more fully hereinafter described, and pointed out in the claims, and shown in the drawings submitted herewith, in which—

Figure 2:
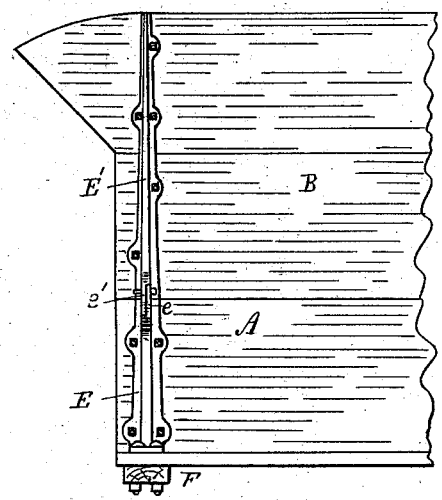
Figure 3:
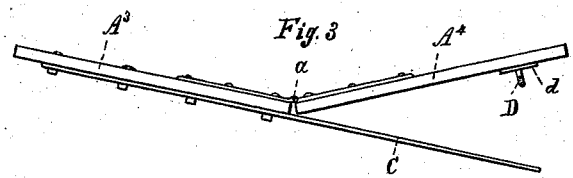
Figure 4:
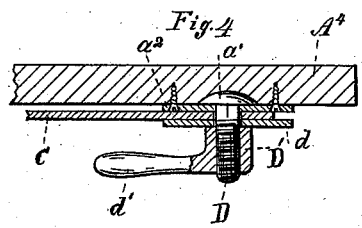

Figure 1 is an end elevation showing the adjustable arm of the stake in full and in dotted lines. Fig. 2 is a side elevation. Fig. 3 is a plan view illustrating features of my invention, and Fig. 4 is a sectional view of certain details.

A represents the lower part of an ordinary wagon-box.

B represents adjustable box sides mounted upon the box A.

A′ represents an end-gate to the lower box.

B′ represents the end-gate of the upper or adjustable portion, said latter gate made removable when it is desired to let down the sides, and held in engagement therewith by a rod, $b$, when the sides are in upright position.

A² is a rod uniting the sides of the lower box.

One feature of my invention is to make a portion of the end of the gate A′ removable to facilitate the discharge of grain—for instance, from the box. I accomplish this feature as follows: The lower portion of the end-gate is constructed of removable wings A³ and A⁴, having a hinged engagement at their adjacent edges, as shown at $a$, so that said wings may be flexed outward, as shown in Fig. 3, and thereby permit the ready removal of the wings from the box. To secure the wings in place, I provide a cleat, C, engaged upon one of the wings, and at the opposite end removably secured in place upon a bolt, D, provided with nut D′. I prefer to secure said bolt, as shown in Fig. 4, by recessing the adjacent wing to receive the head of the bolt, as at $a'$, and engaging upon the wing a washer, $a^2$, constructed with a square orifice to receive the square shoulder of the bolt, its head being engaged in said recess. When the cleat is engaged upon the bolt, it is locked thereupon by the nut with the intermediate washer, $d$. To prevent accidental displacement of the nut, it may be provided with a weighted arm, $d'$. The operation of liberating the wings will be thus readily understood.

E is the stake, engaged in any suitable manner upon a cleat, F, underneath the box.

A series of stakes are located upon the sides of the box, each provided with an adjustable arm, E′, having a jointed engagement therewith in any desired manner. Thus, as shown in the drawings, the adjacent ends of both the stake and the arm may be constructed with an arc-shaped perforated shoulder, as at $e\ e'$, united upon a hub, as at $e^3$. A pin, $e^4$, may engage the perforations of the respective shoulders to hold the arm in any desired position. The sides B are engaged upon the arms E′, so as to be movable therewith and supported thereby when let down.

It is evident that the sides may thus be let down to any desired angle or be closed up to a perpendicular position.

I do not limit myself to any particular manner of forming the jointed union of the arm with the stake.

A box so constructed may be used for a much greater variety of purposes than ordinary boxes as heretofore constructed—as for carrying loose grain, coal, or live stock—while it may be so arranged as to answer for a hay-rack also.

It is observable that the stake E and the adjustable arm E′, jointly engaged therewith, are each constructed in a single piece, rendering their manufacture simple and economical and their operation ready and convenient. It will also be seen that the cleat C is shorter than the end-gate, and its free end is removably engaged to one of the wings, it being unnecessary that said cleat should engage the ordinary upright cleats of the box.

What I claim is—

1. The combination, with a wagon-stake, of an adjustable arm having a jointed engagement therewith, the stake and the arm each constructed with arcs having registering perforations, and a locking device to engage said arcs and hold the arm in any desired position, substantially as described.

2. The combination, with a wagon-box, A, and stake E, of box sides B and removable end-gate B', an arm, E', having a jointed engagement with said stake and united with the side B, said stake and said arm each constructed in a single integral piece, substantially and in the manner described.

3. The combination, with a wagon-box and an end-gate consisting of jointed removable wings, of a cleat having a fixed engagement with one of said wings and a removable engagement with the adjacent wing, a bolt projecting from one of said wings and pushing through the free end of said cleat, and a tightening-nut, substantially as set forth.

4. The combination, with a wagon-box, of an end-gate consisting of flexibly-connected wings, a cleat having a fixed engagement with one of said wings, a bolt, and a washer for holding the bolt in place on one of said wings, the bolt projecting through the free end of said cleat and provided with a tightening-nut, substantially as set forth.

5. The combination, with a wagon-box, of an end-gate consisting of jointly-connected removable wings, and a cleat shorter than the end-gate, having a fixed engagement at one end with one of the wings, the other end of said cleat removably engaged with the adjacent wing between the ends of said wings, substantially as set forth.

In testimony whereof I sign this specification in the presence of two witnesses.

SOLOMON E. OVIATT.

Witnesses:
R. ANDRÉ,
N. S. WRIGHT.